UNITED STATES PATENT OFFICE.

WILLIAM G. FUERTH, OF NEWARK, NEW JERSEY, ASSIGNOR TO EQUILIBRATOR COMPANY, OF NEWARK, NEW JERSEY, A CORPORATION OF NEW JERSEY.

INK.

970,439.  Specification of Letters Patent.  Patented Sept. 13, 1910.

No Drawing.  Application filed June 26, 1906. Serial No. 323,533.

*To all whom it may concern:*

Be it known that I, WILLIAM G. FUERTH, a citizen of the United States, residing at Newark, in the county of Essex and State of New Jersey, have invented certain new and useful Improvements in Inks; and I do hereby declare the following to be a full, clear, and exact description of the invention, such as will enable others skilled in the art to which it appertains to make and use the same.

My invention relates to improvements in that class of inks used for any copying machines commonly known as the mimeograph, neostyle, and similar machines where the ink is fed through a perforated cylinder on to a cloth mat or other device by which the ink is delivered directly to the stencil from which the copy is made.

My invention has more particularly for its object, the production of an ink, emulsive in form, permanent in character, adaptable to changes of temperature and to various forms of stencil duplicating machines which will also give a perfect impression from a hand written or a typewritten copy.

My invention also particularly relates to inks capable of being used with various forms of perforated metal plates through which the ink is fed and readily adaptable to those various forms, and which will not have any chemical effect upon the metal surfaces of these plates and which will also be neutral to the coated wax sheets used for duplicating purposes.

In the compounding of my ink-emulsion I first prepare an absorbent base or siccative, the equivalents of magnesium carbonate; sulfate of barium; the well known commercial article of "blanc fixe"; French chalk; zinc oxid; or any like absorbent. These bases I charge with the proper proportion of hygroscopic or non-saponifiable ingredients, and triturate, or grind them, as the case may require. I next take the saponifiables, such as fatty oils; castor oil, olive oil, etc., or their equivalent in prepared soaps, in connection with any of the above mentioned bases, and a hygroscopic menstruum, such as glycerin, with the proper proportion of water. For screens of very open construction I prefer an absorbent or earthly base of about 30% by weight of the compound. These are heated and form a ropy fluid.

I will now give for illustration further details of the production of one form of my improved ink. I separately prepare three distinct compositions which for convenience may be called A, B, C. Composition A is prepared as follows: Forty-eight (48) parts glycerin are mixed with sixteen (16) parts water without heat, and to this mixture is added sixteen (16) parts of carbonate of magnesia. Composition B is made by mixing thirty-two (32) parts of water to seventy-two (72) parts of pure glycerin. In this mixture is dissolved ninety-six (96) parts of a powdered soap. Any soap containing no excess of alkali would be suitable for this purpose, though I prefer to use a soap made from linseed oil saponified with potassium hydrate. This mixture should be made without heat. Composition C contains the coloring matter of the ink of which any suitable anilin color about eight (8) parts in weight is added to a mixture of four (4) parts water and six (6) parts glycerin. This mixture of water and glycerin is slightly heated and the anilin coloring dissolved therein. My improved ink is made by adding composition B to composition A, and to the mixture of B and A adding composition C. The preparations above for each composition will make a quantity of each composition complementary to each other.

Instead of carbonate of magnesia above mentioned any suitable filler such as sulfate of barium, (blanc fixe), calcium carbonate, kaolin or other inert mineral substance may be added, in which case the mixture is preferably ground before being used.

I do not wish to be confined specifically to the use of the filler above mentioned. The use of such a filler is important in that it assists to preserve the emulsive properties of the ink, and also renders same of a consistency which flows easily from the brush, yet of a sufficient firmness to give a good typewritten impression.

It will be seen that my improved ink comprises, first, a soap serving as a vehicle or carrier for the coloring matter, which soap possesses the properties of being non-corrosive and neutral to the metal of the stenciling machine, and also neutral or indifferent to the wax and the vegetable fiber of the stencil sheet, and of being smeary or capable of flowing; second, a hygroscopic substance which serves to prevent the soap from drying up or losing moisture, and which also adds miscibility to the soap body; and third, a substance which adds weight or body to the foregoing, so as to make the latter sufficiently stiff and non-flowing for stenciling purposes; this weighting agent being carbonate of magnesia which physically is very smooth and unctuous and of a lubricating nature, which enables it to flow with the requisite freedom through the pores of the stencil cylinder and through the ink mat, and also to pass through the opening in the delicate waxed stencil sheet without injury thereto.

The waxed stencil sheet is adjusted upon an ink-cloth or mat, and the latter firmly held upon a perforated metal cylinder or drum, the interior of which is charged with the stenciling ink herein disclosed, which passes through the perforations and is absorbed within the weave of the ink-mat. The paper sheet to be stenciled is passed between the drum and a pressure roll, which causes the ink to be drawn or pressed from the ink-mat through the stencil onto the paper sheet, whereby a printed or stenciled copy is obtained.

By my invention I eliminate the objections heretofore experienced, of clogging of the perforations in the drum or of the pores in the mat, by the drying up of the ink, or by the formation of clots or lumps therein of one or more of its ingredients; of too copious flow of the ink; of the production of objectionable vacuums, or tendencies to produce the same, due to too great viscidity of the ink; and of oxidation or drying up, and "skinning" of the ink; that is, the formation of a skin thereon while in the stenciling machine.

My ink is an extremely hygroscopic composition, which will remain moist in the stenciling machine even if printing is done only at long intervals; and inasmuch as its original alkaline properties have been neutralized, it will not corrode the metal parts of the stenciling machine. It will not clog the perforations nor clog the ink mat, and the latter remains serviceable until worn threadbare.

Where the perforations in the stenciling cylinder are large and relatively few, say 64 to the square inch, the ink should contain the aforesaid absorbent filling or siccative base, so that the ink may not flood through the perforations, but may remain upon the interior of the drum until drawn upon in the printing process. Said absorbent filling is not however necessary where a finer screen is used, and it may therefore be omitted, and the hygroscopic vehicle in such a case may include polysaccharides, isomeric with cane-sugar or dextrin, which are heated with the other elements of the composition until the proper consistency is obtained.

It will be seen that I prepare my hygroscopic by means of fixed oils or glycerids, non-saponifiables, and natural incompatibles which are bound with saponifiables by means of alkaline menstruums and the absorbent earths incorporated both for drying as well as for the purpose of taking up the free liquids or super-natants; and by this means I guard the compound against variations caused by fermentation or the development of the higher alcohols, which would tend to split the composition, or cause the deposit of a precipitate. The compound does not deteriorate with age, but rather improves. It is neutral to the metal surfaces of the stenciling machine, and will dry with reasonable celerity, without running or spreading.

I am aware that it is old in the art to make printing inks in which mineral substances either colored or uncolored are used, and I am also aware that other varieties of ink have been made to which mineral substances have been added, but it is new in the art to make an ink for duplicating machines in which a mineral filler is an ingredient and which is of a permanent character and in which the ingredients will not separate from each other.

What I claim and desire to secure by Letters Patent, is as follows:

1. An ink for stencil duplicating purposes comprising water, coloring matter, glycerin, soap, and carbonate of magnesia.

2. A hygroscopic ink for stencil duplicating purposes, containing soap, a body of carbonate of magnesia, water, hygroscopic substance, and a coloring matter.

3. Water, coloring matter, soap, and an unctuous mineral filler, compounded with glycerin to form an ink, the proportion of the glycerin to the mineral filler being such as to render the ink hygroscopic.

4. Water, coloring matter, free glycerin, soap, and glucose, compounded with an unctuous mineral filler to form a hygroscopic stenciling ink.

5. Water, soap, coloring matter, an unctuous mineral filler, and saccharine matter, compounded with sufficient free glycerin to form a hygroscopic ink.

6. A free hygroscopic element, water, coloring matter, and a highly plastic soap, compounded with an unctuous earthly base which is chemically indifferent to stencil-wax, to form a hygroscopic semi-fluid ink composition.

7. An absorbent unctuous mineral filler, coloring matter, water, and glycerin, compounded with soap to form a stenciling ink, the proportion of the glycerin to the filler being such as to render the ink hygroscopic, the filler comprising about 30% by weight of the compound.

In testimony, that I claim the invention set forth above I have hereunto set my hand this 25th day of June, 1906.

WILLIAM G. FUERTH.

Witnesses:
FREDK. C. FRAENTZEL,
FREDERICK JAMISON.